(12) United States Patent
Song et al.

(10) Patent No.: US 11,824,456 B2
(45) Date of Patent: Nov. 21, 2023

(54) HYBRID FLYBACK CIRCUIT AND CONTROL METHOD

(71) Applicant: Delta Electronics (Shanghai) Co., Ltd., Shanghai (CN)

(72) Inventors: Haibin Song, Shanghai (CN); Hairui Xu, Shanghai (CN); Fengkai Jiang, Shanghai (CN); Daofei Xu, Shanghai (CN); Jinfa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 163 days.

(21) Appl. No.: 17/573,480

(22) Filed: Jan. 11, 2022

(65) Prior Publication Data

US 2023/0080559 A1    Mar. 16, 2023

(30) Foreign Application Priority Data

Sep. 10, 2021   (CN) .......................... 202111061893.7

(51) Int. Cl.
| | |
|---|---|
| *H02M 3/335* | (2006.01) |
| *H02M 3/00* | (2006.01) |
| *H02M 1/00* | (2006.01) |
| *H02M 1/08* | (2006.01) |
| *H02M 1/38* | (2007.01) |

(52) U.S. Cl.
CPC ..... *H02M 3/33571* (2021.05); *H02M 1/0009* (2021.05); *H02M 1/0095* (2021.05); *H02M 1/083* (2013.01); *H02M 1/38* (2013.01); *H02M 3/01* (2021.05); *H02M 3/33507* (2013.01);
(Continued)

(58) Field of Classification Search
CPC ............... H02M 3/01; H02M 3/33507; H02M 3/33523; H02M 3/33561; H02M 3/33569
See application file for complete search history.

(56) References Cited

U.S. PATENT DOCUMENTS

| 9,143,043 B2 | 9/2015 | Zhang et al. |
|---|---|---|
| 9,590,492 B2 | 3/2017 | Chang et al. |

(Continued)

FOREIGN PATENT DOCUMENTS

| CN | 105281576 B | 6/2018 |
|---|---|---|
| CN | 105932880 B | 11/2018 |

(Continued)

*Primary Examiner* — Gary A Nash
(74) *Attorney, Agent, or Firm* — KIRTON McCONKIE; Evan R. Witt (57) ABSTRACT

A hybrid flyback circuit is provided and includes an upper switch, a lower switch, a transformer, a resonant circuit, a current sampling circuit and a control unit. The control unit includes an output voltage feedback unit, a peak current comparison unit controlling the upper switch to turn off when a sampling voltage corresponding to the current sampling signal is equal to the first voltage feedback signal, a first dead time delay unit controlling the lower switch to turn on after a first dead time starting from the turn-off time of the upper switch, a negative peak current feedback unit for generating a second voltage feedback signal, a conduction control unit controlling the lower switch to turn off, and a second dead time delay unit controlling the upper switch to turn on after a second dead time starting from the turn-off time of the lower switch.

18 Claims, 4 Drawing Sheets

(52) U.S. Cl.
CPC .... *H02M 3/33523* (2013.01); *H02M 3/33592* (2013.01)

(56) References Cited

U.S. PATENT DOCUMENTS

| | | | |
|---|---|---|---|
| 9,705,413 B2 | 7/2017 | Zhang et al. | |
| 10,581,319 B1 * | 3/2020 | Lin | H02M 3/33553 |
| 2013/0229829 A1 | 9/2013 | Zhang et al. | |
| 2015/0357927 A1 | 12/2015 | Zhang et al. | |
| 2015/0381060 A1 | 12/2015 | Eng et al. | |
| 2018/0294734 A1* | 10/2018 | Song | H02M 3/33592 |
| 2018/0358902 A1* | 12/2018 | Duvnjak | H02M 3/33592 |
| 2019/0393769 A1* | 12/2019 | Wei | H02M 3/33592 |
| 2020/0091828 A1* | 3/2020 | Fang | H02M 3/01 |

FOREIGN PATENT DOCUMENTS

| | | |
|---|---|---|
| CN | 110719029 A | 1/2020 |
| CN | 111010036 A | 4/2020 |
| CN | 112067886 A | 12/2020 |
| TW | I596880 B | 8/2017 |
| TW | 202010231 A | 3/2020 |

* cited by examiner

HYBRID FLYBACK CIRCUIT AND CONTROL METHOD

CROSS-REFERENCE TO RELATED APPLICATION

This application claims priority to China Patent Application No. 202111061893.7, filed on Sep. 10, 2021, the entire contents of which are incorporated herein by reference for all purposes.

FIELD OF THE INVENTION

The present disclosure relates to a flyback circuit, and more particularly to a hybrid flyback circuit and a control method thereof.

BACKGROUND OF THE INVENTION

Hybrid flyback circuit has excellent characteristics similar to the LLC resonant converter. That is, the primary side switch of the hybrid flyback circuit is turned on with zero voltage (ZVS), and the secondary side switch of the hybrid flyback circuit is turned off with zero current (ZCS). Meanwhile, the hybrid flyback circuit has better performance in regulating the output voltage, so it is suitable for variable output voltage applications, such as USB PD type-C adapter and charger.

The hybrid flyback circuit usually includes a resonant circuit, a half-bridge switching circuit, a transformer and a rectifier circuit. The resonant circuit includes a resonant inductor and a resonant capacitor. When the hybrid flyback circuit starts to work, in order to achieve ZVS of the upper switch of the half-bridge switching circuit, the magnetizing current of the magnetizing inductor needs to rise from a negative peak value. And such negative peak value must be larger enough to realize ZVS function. However, once the negative peak value is excessively high beyond a suitable range, it may bring additional losses, thereby reducing the efficiency of the hybrid flyback circuit. Therefore, the key to the optimal control of the hybrid flyback circuit is to accurately control the negative peak value of the magnetizing current to be a suitable value, so that the negative peak value can achieve ZVS of the upper switch of the half-bridge switching circuit appropriately.

SUMMARY OF THE INVENTION

In accordance with an aspect of the present disclosure, there is provided a hybrid flyback circuit. The hybrid flyback circuit includes a half-bridge switching circuit, a transformer, a resonant circuit, a current sampling circuit, a rectifier circuit and a control unit. The half-bridge switching circuit has a first switch and a second switch electrically connected in series. The transformer has a primary winding and a secondary winding magnetically coupled to each other. The resonant circuit is electrically connected in series to the primary winding of the transformer. The current sampling circuit is configured to sample a primary current of the transformer and output a current sampling signal. The rectifier circuit is electrically connected to the secondary winding of the transformer. The control unit is configured to control the first switch and the second switch of the half-bridge switching circuit. The control unit includes an output voltage feedback unit, a peak current comparison unit, a first dead time delay unit, a negative peak current feedback unit, a conduction control unit and a second dead time delay unit. The output voltage feedback unit is configured to generate a first voltage feedback signal according to a reference voltage and an output voltage of the hybrid flyback circuit. The peak current comparison unit is configured to compare a sampling voltage corresponding to a current sampling signal with the first voltage feedback signal, wherein when the sampling voltage corresponding to the current sampling signal is equal to the first voltage feedback signal, the control unit turns off the first switch. The first dead time delay unit is configured to drive the control unit to turn on the second switch after a first dead time starting from the turn-off time of the first switch. The negative peak current feedback unit is configured to obtain a negative peak current value of the primary current according to the current sampling signal and generate a second voltage feedback signal according to the negative peak current value and a reference current. The conduction control unit is configured to control a conduction duration of the second switch according to the second voltage feedback signal and the control unit turns off the second switch according to the conduction duration. The second dead time delay unit is configured to drive the control unit to turn on the first switch after a second dead time starting from the turn-off time of the second switch.

In accordance with another aspect of the present disclosure, there is provided a control method for a hybrid flyback circuit. The hybrid flyback circuit includes a half-bridge switching circuit, a transformer, a resonant circuit and a current sampling circuit, the half-bridge switching circuit includes a first switch and a second switch electrically connected in series, the transformer includes a primary winding and a secondary winding magnetically coupled to each other, and the resonant circuit is electrically connected in series to the primary winding. The control method includes steps of: (S1) sampling an output voltage of the hybrid flyback circuit and generating a first voltage feedback signal according to a reference voltage and the output voltage; (S2) sampling a primary current of the transformer and outputting a current sampling signal; (S3) comparing a sampling voltage corresponding to the current sampling signal with the first voltage feedback signal and turning off the first switch when the sampling voltage corresponding to the current sampling signal is equal to the first voltage feedback signal; (S4) turning on the second switch after a first dead time starting from the turn-off time of the first switch; (S5) obtaining a negative peak current value of the primary current according to the current sampling signal and generating a second voltage feedback signal according to the negative peak current value and a reference current; (S6) controlling the conduction duration of the second switch according to the second voltage feedback signal and turning off the second switch; and (S7) turning on the first switch after a second dead time starting from the turn-off time of the second switch.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

In order to control the magnitude of the negative peak value of the magnetizing current, the conventional control strategy of the hybrid flyback circuit is based on adaptive successive approximation. That is, the upper switch of the half-bridge switching circuit is turned off, and after a dead time, the lower switch of the half-bridge switching circuit is turned on with zero voltage, and the turn-off time of the lower switch of the half-bridge switching circuit is adaptively adjusted by detecting whether the upper switch is turned on with zero voltage. The adaptive adjustment method is to directly or indirectly detect whether the upper switch can be turned on with zero voltage after the dead time starting from the turn-off time of the lower switch. If the upper switch cannot be turned on with zero voltage, the conduction duration of the lower switch in the next switching cycle will be increased by an adjustment unit on the basis of that in the previous switching cycle, so as to increase the magnitude of the negative peak value of the magnetizing current, and ZVS of the upper switch is realized. After one or more switching cycles, the ZVS of the upper switch is achieved eventually. In addition, if the upper switch has achieved ZVS, the conduction duration of the lower switch in the next switching cycle will be reduced by an adjustment unit on the basis of that in the previous switching cycle, so as to reduce the magnitude of the negative peak value of the magnetizing current. After one or more switching cycles, the upper switch can deviate from the ZVS condition eventually. Finally, the negative peak value of the magnetizing current can be dynamically maintained close to the ideal value required to realize the ZVS of the half-bridge switching circuit.

Although the above-mentioned conventional control method of the hybrid flyback circuit can achieve ZVS and control the negative peak value of the magnetizing current close to the ideal value, it also has some disadvantages. For example, only when the output current of the hybrid flyback circuit is constant, the negative peak value of the magnetizing current can always be maintained close to the ideal value. Once the output current has changed, the negative peak value of the magnetizing current will change. As a result, the negative peak value needs to be adjusted dynamically before it returns to the ideal value. Regarding to the dynamic adjustment, if the selected adjustment unit time is relatively small, more switching cycles are required to adjust the negative peak value of the magnetizing current to the ideal value for the same current value deviation. If the output current of the hybrid flyback circuit is in a fast dynamic process, the adjustment speed of the negative peak value of the magnetizing current cannot keep up with the dynamic requirements of the hybrid flyback circuit, resulting in the degradation performance of the hybrid flyback circuit. On the other hand, if the selected adjustment unit time is relatively large, although the adjustment speed of the negative peak value of the magnetizing current can be accelerated, it will also cause the final adjusted negative peak value of the magnetizing current to deviate from its ideal value greatly, which affects the efficiency of the steady state.

Figure 1:
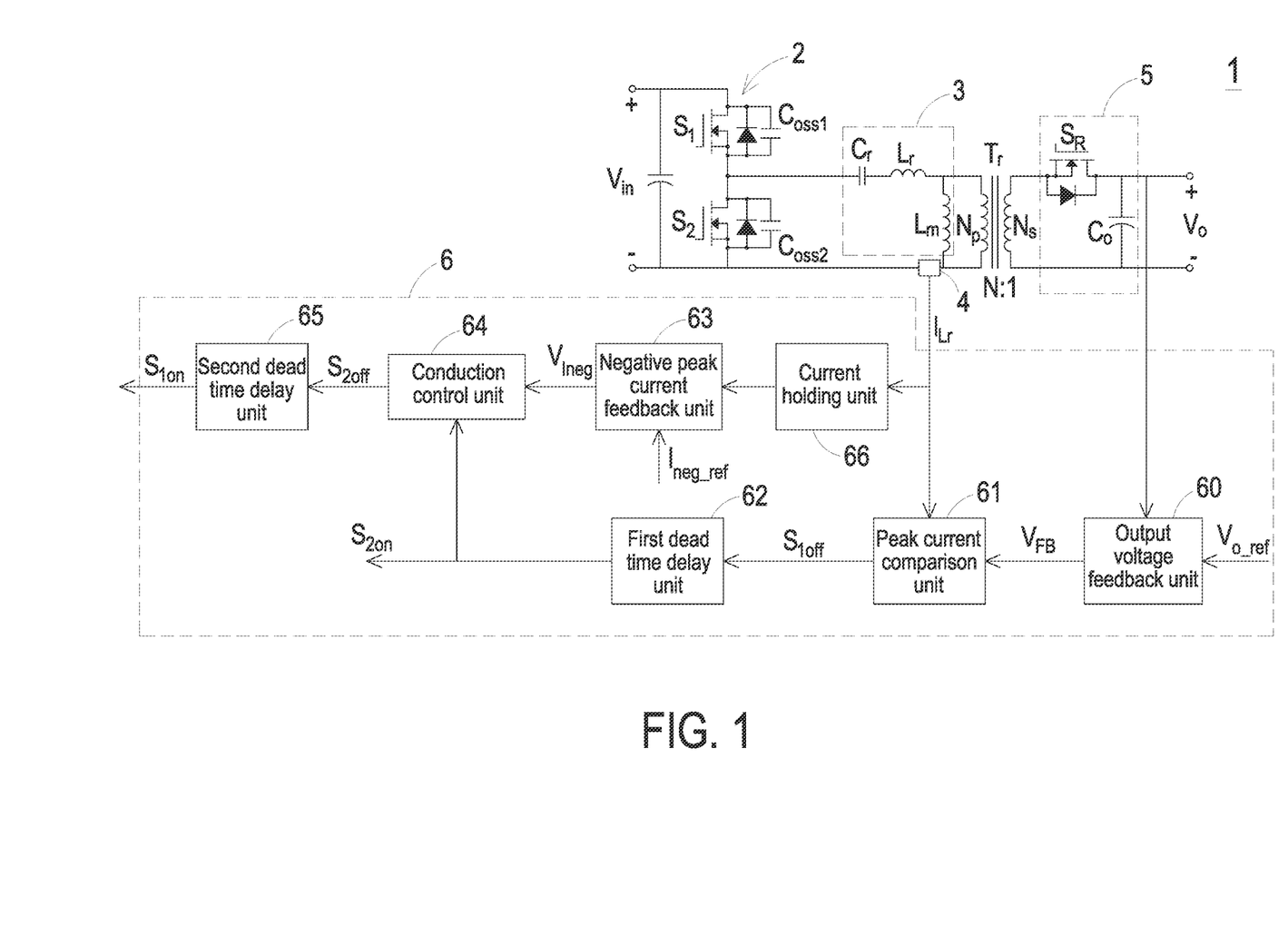
FIG. 1 is a schematic circuit diagram illustrating a hybrid flyback circuit according to an embodiment of the present disclosure.
Figure 2:
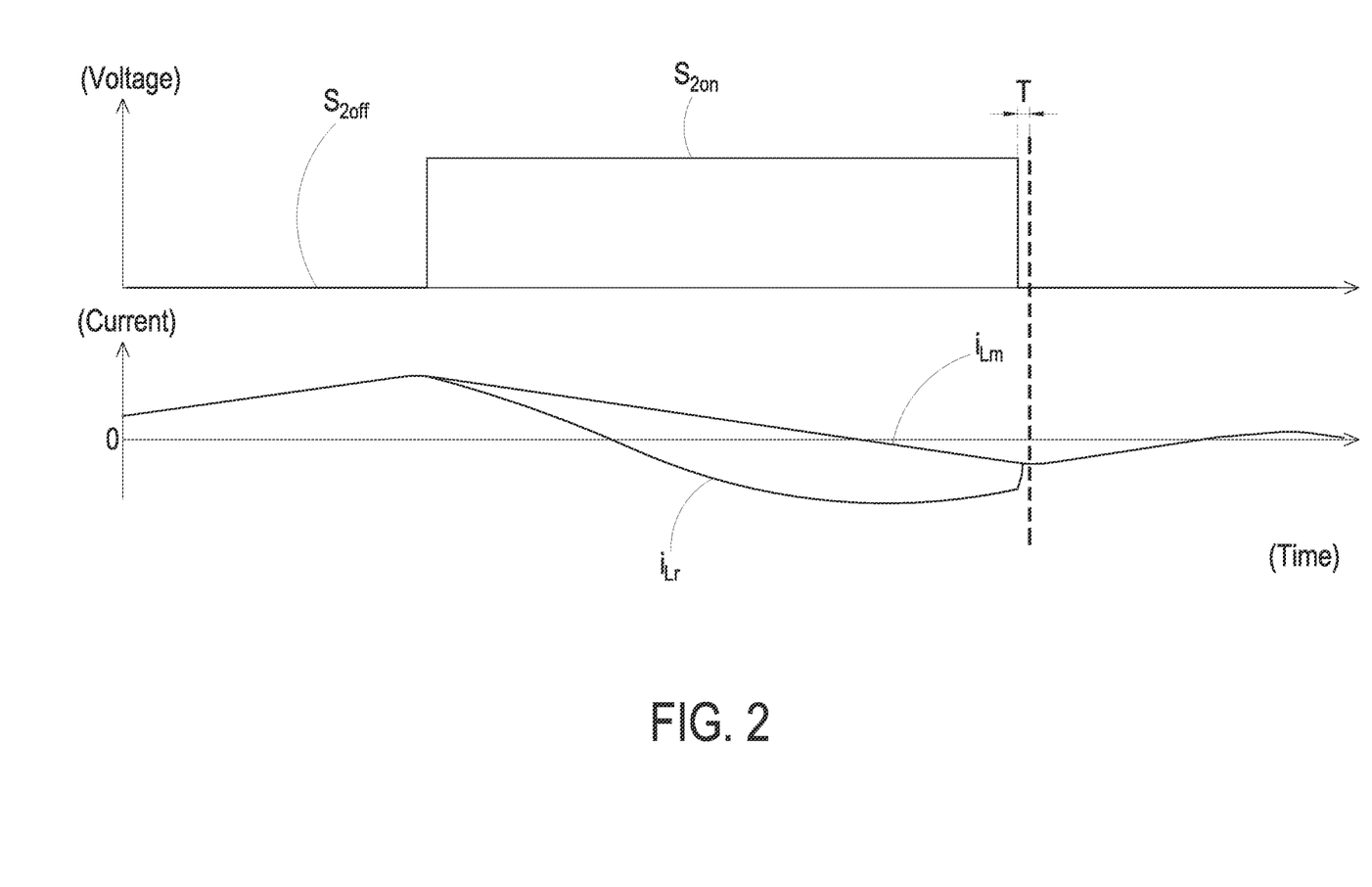
FIG. 2 is a schematic waveform of the voltage and current of the hybrid flyback circuit in FIG. 1.

Please refer to FIGS. 1 and 2. FIG. 1 is a schematic circuit diagram illustrating a hybrid flyback circuit according to an embodiment of the present disclosure. FIG. 2 is a schematic waveform of the voltage and current of the hybrid flyback circuit in FIG. 1. In this embodiment, the hybrid flyback circuit 1 receives an input voltage $V_{in}$ at an input side, and converts the input voltage $V_{in}$ into an output voltage $V_o$, and outputs the output voltage $V_o$ at an output side. The hybrid flyback circuit 1 includes a half-bridge switching circuit 2, a transformer $T_r$, a resonant circuit 3, a current sampling circuit 4, a rectifier circuit 5 and a control unit 6.

The half-bridge switching circuit 2 is electrically connected to the input terminals of the hybrid flyback circuit 1 and receives the input voltage $V_{in}$. The half-bridge switching circuit 2 includes an upper switch $S_1$ and a lower switch $S_2$. The upper switch $S_1$ and the lower switch $S_2$ are electrically connected in series at a junction node of the half-bridge switching circuit 2. The transformer $T_r$ includes a primary winding $N_p$ and a secondary winding $N_s$ magnetically coupled to each other, and the turns ratio of the primary winding $N_p$ and the secondary winding $N_s$ is N:1, where N is a positive number.

The resonant circuit 3 is electrically connected in series to the primary winding $N_p$ and is electrically connected to the half-bridge switching circuit 2. In an embodiment, as shown in FIG. 1, the resonant circuit 3 is electrically connected to the junction node between the upper switch $S_1$ and the lower switch $S_2$.

In an embodiment, the resonant circuit 3 may include a resonant capacitor $C_r$ and a resonant inductor $L_r$. The resonant capacitor $C_r$ and the resonant inductor $L_r$ are electrically connected in series between the half-bridge switching circuit 2 and the primary winding $N_p$.

The current sampling circuit 4 is configured to sample the primary current of the transformer $T_r$ and output a current sampling signal $I_{Lr}$. In an embodiment, the current sampling circuit 4 may be formed by a resistor or a Hall sensor, but not limited thereto. In addition, the primary current of the transformer $T_r$ may refer to the current flowing through the resonant capacitor $C_r$ and the resonant inductor $L_r$. Therefore, the current sampling circuit 4 may be electrically connected to the position shown in FIG. 1, namely the current sampling circuit 4 is electrically connected to the negative terminal of the half-bridge switching circuit 2, the magnetizing inductor $L_m$ and the primary winding $N_p$, but not limited thereto. For example, in another embodiment, the current sampling circuit 4 may be electrically connected between the junction node of the upper switch $S_1$ and the lower switch $S_2$ and the resonance capacitor $C_r$.

The rectifier circuit 5 is electrically connected between the secondary winding $N_s$ of the transformer $T_r$ and the output terminal of the hybrid flyback circuit 1 for rectifying operation. In an embodiment, the rectifier circuit 5 includes at least one rectifier switch $S_R$ and an output capacitor $C_O$. The rectifier switch $S_R$ is electrically connected to the secondary winding $N_s$ of the transformer $T_r$. The output capacitor $C_O$ is electrically connected to the rectifier switch $S_R$ and the output terminal of the hybrid flyback circuit 1.

The control unit 6 is electrically connected to the half-bridge switching circuit 2 and the current sampling circuit 4.

The control unit 6 is configured to output different control signals to turn on or turn off the upper switch $S_1$ and the lower switch $S_2$ of the half-bridge switching circuit 2 respectively, and the control signals of the upper switch $S_1$ and the lower switch $S_2$ are complementary. The control unit 6 includes an output voltage feedback unit 60, a peak current comparison unit 61, a first dead time delay unit 62, a negative peak current feedback unit 63, a conduction control unit 64 and a second dead time delay unit 65.

The output voltage feedback unit 60 is electrically connected to the output terminal of the hybrid flyback circuit 1 and is configured to generate the first voltage feedback signal $V_{FB}$ according to the reference voltage $V_{O\_ref}$ and the output voltage $V_O$ of the hybrid flyback circuit 1. The peak current comparison unit 61 is electrically connected to the output voltage feedback unit 60 and the current sampling circuit 4 and is configured to compare a sampling voltage corresponding to the current sampling signal $I_{Lr}$ with the first voltage feedback signal $V_{FB}$. When the sampling voltage corresponding to the current sampling signal $I_{Lr}$ is equal to the first voltage feedback signal $V_{FB}$, a turn-off control signal $S_{1off}$ is used to turn off the upper switch $S_1$.

The first dead time delay unit 62 is electrically connected to the peak current comparison unit 61 and is configured to generate a turn-on control signal $S_{2on}$ to turn on the lower switch $S_2$ after the first dead time starting from the turn-off time of the upper switch $S_1$. In an embodiment, the turn-off control signal $S_{1off}$ output by the peak current comparing unit 61 is provided to the first dead time delay unit 62. After the upper switch $S_1$ is turned off and the first dead time is delayed from the turn-off time of the upper switch $S_1$, the first dead time delay unit 62 generates the turn-on control signal $S_{2on}$ to turn on the lower switch $S_2$.

The negative peak current feedback unit 63 is configured to obtain the negative peak current value of the primary current according to the current sampling signal $I_{Lr}$ and configured to generate a second voltage feedback signal $V_{1neg}$ according to the obtained negative peak current value and the reference current $I_{neg\_ref}$. The conduction control unit 64 is electrically connected to the negative peak current feedback unit 63 and is configured to control the conduction duration of the lower switch $S_2$ according to the second voltage feedback signal $V_{1neg}$ and generate a turn-off control signal $S_{2off}$ to turn off the lower switch $S_2$. The second dead time delay unit 65 is electrically connected to the conduction control unit 64 and is configured to generate the turn-on control signal $S_{1on}$ to turn on the upper switch $S_1$ after the second dead time starting from the turn-off time of the lower switch $S_2$. In an embodiment, the turn-off control signal $S_{2off}$ output by the conduction control unit 64 is provided to the second dead time delay unit 65, and after the lower switch $S_2$ is turned off and the second dead time is delayed from the turn-off time of the lower switch $S_2$, the second dead time delay unit 65 generates the turn-on control signal $S_{1on}$ to turn on the upper switch $S_1$. In addition, in this embodiment, the turn-on control signal $S_{1on}$ is for example at high level, and the turn-off control signal $S_{1off}$ is for example at low level. The control signal received by a control unit or a drive unit for the upper switch $S_1$ is formed by the turn-on control signal $S_{1on}$ and the turn-off control signal $S_{1off}$. In similar, the turn-on control signal $S_{2on}$ is for example at high level, and turn-off control signal $S_{2off}$ is for example at low level. The control signal received by a control unit or a drive unit for the lower switch $S_2$ is formed by the turn-on control signal $S_{2on}$ and the turn-off control signal $S_{2off}$.

Compared with the traditional control method of adaptive adjustment of the hybrid flyback circuit, in the hybrid flyback circuit 1 of the present disclosure, after the lower switch $S_2$ of the half-bridge switching circuit 2 is turned on with zero voltage, the conduction duration of the lower switch $S_2$ is controlled by the feedback control, and the lower switch $S_2$ is turned off accordingly. As the feedback control is taken, the response speed of the feedback control loop may be set by adjusting the parameters of the feedback control loop, and the crossover frequency can ideally reach half of the switching frequency. Therefore, the adjustment speed of the negative peak value of the magnetizing current can meet the requirements of the output dynamics of the hybrid flyback circuit 1. Meanwhile, since the hybrid flyback circuit 1 of the present disclosure applies feedback control, the negative peak value of the magnetizing current will be latched close to the set ideal value, which achieves a higher efficiency of the hybrid flyback circuit 1 of the present disclosure in steady-state operation.

In above embodiments, the reference current $I_{neg\_ref}$ satisfies the following formula (1).

$$I_{neg\_ref} \geq \sqrt{\frac{(C_{oss1} + C_{oss2})V_{in}^2}{L_m}} \quad (1)$$

$L_m$ is the inductance value of the magnetizing inductor of the transformer $T_r$, $I_{neg\_ref}$ is the reference current, $C_{OSS1}$ is the capacitance value of the first parasitic capacitor of the upper switch $S_1$, $C_{OSS2}$ is the capacitance value of the second parasitic capacitor of the lower switch $S_2$, and $V_{in}$ is the input voltage $V_{in}$ received by the hybrid flyback circuit 1. Furthermore, in an embodiment, the negative peak current value obtained by the negative peak current feedback unit 63 is equal to the negative peak current value of the primary current after a second set time starting from the turn-off time of the lower switch $S_2$ in the previous switching cycle.

It is noted that FIG. 1 only shows the schematic circuit diagram illustrating the hybrid flyback circuit according to one embodiment of the present disclosure. In another embodiment, the primary winding Np of the transformer Tr is electrically coupled to two power terminals of the upper switch $S_1$ through the resonance circuit 3. That is, one terminal of the primary winding $N_p$ is electrically connected to the junction node of the upper switch $S_1$ and the lower switch $S_2$ through the resonant inductor $L_r$ and the resonant capacitor $C_r$, and the other terminal of the primary winding $N_p$ is electrically connected to the positive input terminal of the hybrid flyback circuit. The circuit structure is also applied to the above-mentioned control method, and in this alternative embodiment, the switching sequence of the upper switch $S_1$ and the switching sequence of the lower switch $S_2$ need to be exchanged with regard to the embodiment as shown in FIG. 1. That is, the output voltage feedback unit 60 of the control unit 6 generates the first voltage feedback signal $V_{FB}$, the peak current comparison unit 61 generates a turn-off control signal $S_{2off}$ to turn off the lower switch $S_2$. The first dead time delay unit 62 generates a turn-on control signal $S_{1on}$ to turn on the upper switch $S_1$ after the first dead time starting from the turn-off time of the lower switch $S_2$. The conduction control unit 64 controls the conduction duration of the upper switch $S_1$ and generates a turn-off control signal $S_{1off}$ to turn off the upper switch $S_1$. The second dead time delay unit 65 generates the turn-on control signal $S_{2on}$ to turn on the lower switch $S_2$ after the second dead time starting from the turn-off time of the upper switch $S_1$. The following description is still based on the schematic circuit diagram of the hybrid flyback circuit shown in FIG. 1.

It should be noted that, considering that the circuit structure of the hybrid flyback circuit is different, the corresponding switching control sequence should also be changed accordingly. For the unity of description, in the present disclosure, the switch of the half-bridge switching circuit connected in parallel with the primary winding $N_p$ of the transformer $T_r$ is defined as the second switch, and the other switch of the half-bridge switching circuit 2 is defined as the first switch. That is, when the circuit structure of the hybrid flyback circuit shown in FIG. 1 is applied, the upper switch $S_1$ works as the first switch, and the lower switch $S_2$ works as the second switch. Alternatively and exemplarily, when the primary winding $N_p$ of the transformer $T_r$ is electrically connected to two power terminals of the upper switch $S_1$ through the resonance circuit 3, the upper switch $S_1$ works as the second switch, and the lower switch $S_2$ works as the first switch.

Please refer to FIG. 2 in conjunction with FIG. 1. FIG. 2 is a waveform diagram of the control signal received by the lower switch, the resonant current flowing through the resonant inductor, and the magnetizing current flowing through the magnetizing inductor in FIG. 1. In an embodiment, as shown in FIG. 1, the control unit 6 further includes a current holding unit 66 configured to detect the turn-off time of the lower switch $S_2$. For example, according to the falling edge of the control signal (i.e., turn-on control signal $S_{2on}$) provided by the control unit 6 to the lower switch $S_2$, the turn-off time of the lower switch $S_2$ is detected. After the lower switch $S_2$ is turned off and the second set time is delayed from the turn-off time of the lower switch $S_2$, the negative peak current value of the primary current is obtained according to the current sampling signal $I_{Lr}$. That is, as shown in FIG. 2, after the second set time T starting from the falling edge of the turn-on control signal $S_{2on}$, the current holding unit 66 obtains the negative peak current value of the primary current according to the current sampling signal $I_{Lr}$. The obtained primary current is the required negative peak current value, and the current holding unit 66 maintains the negative peak current value until the next switching cycle for calculation. In an embodiment, the second set time is less than or equal to 200 ns. In addition, in FIG. 2, $i_{Lr}$ is the current flowing through the resonant inductor Lr, and $i_{Lm}$ is the current flowing through the magnetizing inductor $L_m$.

In addition, in an embodiment, the output voltage $V_O$ of the hybrid flyback circuit 1 may be variable, and the output voltage $V_O$ may be such as 5V, 9V, 15V, or 20V, but not limited thereto.

Figure 3:
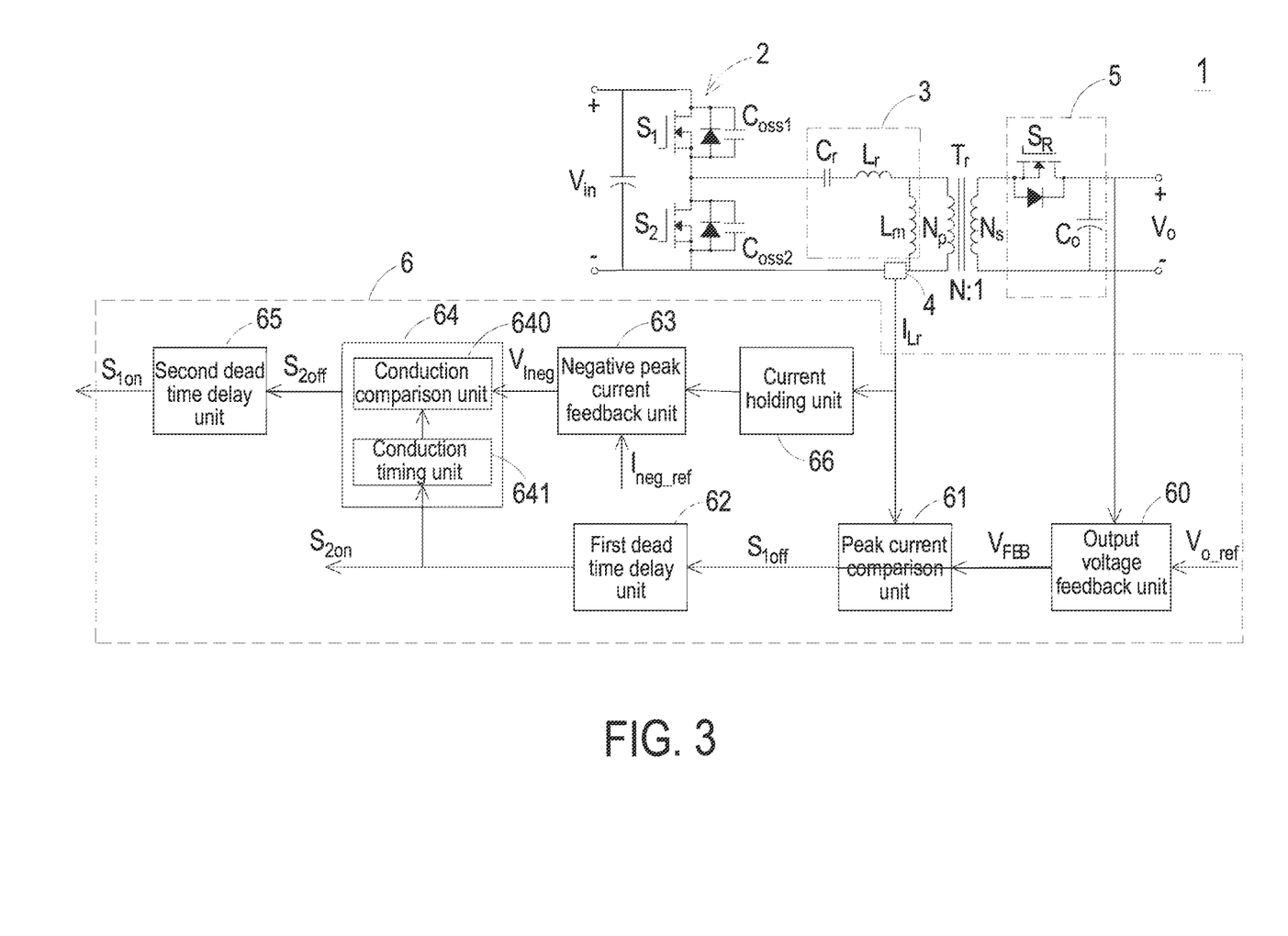
FIG. 3 is a schematic circuit diagram illustrating the conduction control unit of the hybrid flyback circuit in FIG. 1.

Please refer to FIG. 3. FIG. 3 is a schematic circuit diagram illustrating the conduction control unit of the hybrid flyback circuit in FIG. 1. In an embodiment, the conduction control unit 64 further includes a conduction comparison unit 640 and a conduction timing unit 641. The conduction timing unit 641 is electrically connected to the first dead time delay unit 62 and is configured to detect the turn-on time of the lower switch $S_2$ according to the turn-on control signal $S_{2on}$ generated by the first dead time delay unit 62, so as to generate a voltage signal reflecting the conduction duration of the lower switch $S_2$. The conduction comparison unit 640 is electrically connected to the conduction timing unit 641, the negative peak current feedback unit 63 and the second dead time delay unit 65. The conduction comparison unit 640 is configured to compare the voltage signal output by the conduction timing unit 641 with the second voltage feedback signal $V_{1neg}$. When the voltage signal output by the conduction timing unit 641 is equal to the second voltage feedback signal $V_{1neg}$, the turn-off control signal $S_{2off}$ is generated to turn off the lower switch $S_2$.

In an embodiment, the conduction timing unit 641 detects the turn-on time of the lower switch $S_2$. The conduction timing unit 641 obtains the conduction duration of the lower switch $S_2$ and outputs a timing result. The conduction comparison unit 640 sets a first set time length according to the second voltage feedback signal $V_{1neg}$, and the conduction comparison unit 640 determines whether the conduction duration of the lower switch $S_2$ is equal to the first set time length according to the timing result output by the conduction timing unit 641. When the conduction duration of the lower switch $S_2$ is equal to the first set time length, the conduction comparison unit 640 generates a turn-off control signal $S_{2off}$ to turn off the lower switch $S_2$.

Figure 4:
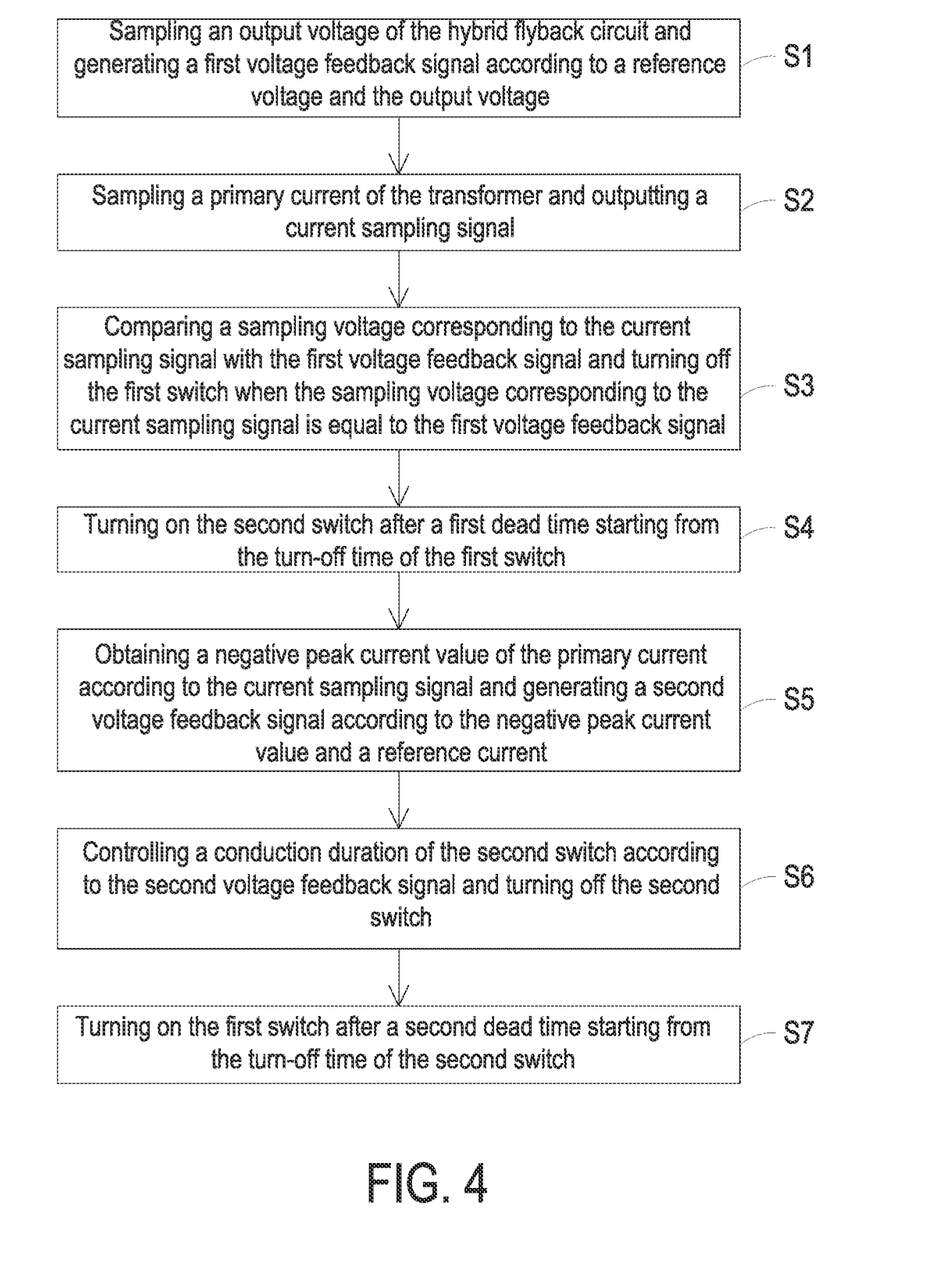
FIG. 4 is a flow chart illustrating a control method applied to the control unit of the hybrid flyback circuit in FIG. 1 according to an embodiment of the present disclosure.

Please refer to FIG. 4 in conjunction with FIG. 1. FIG. 4 is a flow chart illustrating a control method applied to the control unit of the hybrid flyback circuit in FIG. 1 according to an embodiment of the present disclosure. The hybrid flyback circuit control method of this embodiment is applicable to the control unit 6 of the hybrid flyback circuit 1 mentioned above in FIG. 1. The control method may be realized by the following steps S1~S6.

In step S1, the output voltage feedback unit 60 samples the output voltage $V_O$ of the hybrid flyback circuit 1 and generates a first voltage feedback signal $V_{FB}$ according to the reference voltage $V_{o\_ref}$ and the output voltage $V_O$.

In step S2, the current sampling circuit 4 samples the primary current of the transformer $T_r$ and outputs a current sampling signal $I_{Lr}$.

In step S3, the peak current comparison unit 61 of the control unit 6 compares a sampling voltage corresponding to the current sampling signal $I_{Lr}$ with the first voltage feedback signal $V_{FB}$. When the sampling voltage corresponding to the current sampling signal $I_{Lr}$ is equal to the first voltage feedback signal $V_{FB}$, the peak current comparison unit 61 drives the control unit 6 to turn off the upper switch $S_1$.

In step S4, the first dead time delay unit 62 of the control unit 6 drives the control unit 6 to turn on the lower switch $S_2$ after the first dead time starting from the turn-off time of the upper switch $S_1$.

In step S5, the negative peak current feedback unit 63 of the control unit 6 obtains the negative peak current value of the primary current according to the current sampling signal $I_{Lr}$ and generates the second voltage feedback signal $V_{1neg}$ according to the negative peak current value and the reference current $I_{neg\_ref}$.

In step S6, the conduction control unit 64 of the control unit 6 controls the conduction duration of the lower switch $S_2$ according to the second voltage feedback signal and drives the control unit 6 to turn off the lower switch $S_2$.

In step S7, the second dead time delay unit 65 of the control unit 6 drives the control unit 6 to turn on the upper switch $S_1$ after the second dead time starting from the turn-off time of the lower switch $S_2$.

It should be noted that the above step S1 and step S2 may be interchangeable or integrated into a single step. In some embodiments, the output voltage may be sampled first, and then the primary current is sampled. Alternatively, the primary current may be sampled first, and then the output voltage is sampled. In some embodiments, the output voltage and primary current can be sampled in a single step.

In an embodiment, the step S6 further includes a first substep and a second substep. In the first substep, the conduction timing unit 641 of the conduction control unit 64 detects the turn-on time of the lower switch $S_2$ to generate a voltage signal reflecting the conduction duration of the lower switch $S_2$. In the second substep, the conduction comparison unit 640 of the conduction control unit 64 compares the generated voltage signal with the second voltage feedback signal $V_{1neg}$, and when the voltage signal is equal to the second voltage feedback signal $V_{1neg}$, the conduction comparison unit 640 generates a turn-off control signal $S_{2off}$ to drive the control unit 6 to turn off the lower switch $S_2$.

In another embodiment, the step S6 may further include a third substep and a fourth substep. In the third substep, the conduction timing unit 641 of the conduction control unit 64 detects the turn-on time of the lower switch $S_2$, obtains the conduction duration of the lower switch $S_2$, and outputs the timing result. In the fourth substep, the conduction comparison unit 640 of the conduction control unit 64 sets the first set time length according to the second voltage feedback signal $V_{1neg}$, and when the timing result is equal to the first set time length, the conduction comparison unit 640 generates a turn-off control signal $S_{2off}$ to drive the control unit 6 to turn off the lower switch $S_2$.

From the above descriptions, in the hybrid flyback circuit of the present disclosure, after the lower switch of the half-bridge switching circuit is turned on with zero voltage, the conduction duration of the lower switch is controlled by the feedback control, and then the lower switch is turned off accordingly. As the feedback control is taken, the response speed of the feedback loop is set by adjusting the parameters of the feedback loop, and the crossover frequency can ideally reach a half of the switching frequency. Therefore, the adjustment speed of the negative peak value of the magnetizing current can meet the requirements of the output dynamics of the hybrid flyback circuit. Also, since the hybrid flyback circuit of the present disclosure applies feedback control, the negative peak value of the magnetizing current will be latched close to the set ideal value, which achieves a higher efficiency of the hybrid flyback circuit 1 of the present disclosure in steady-state operation.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A hybrid flyback circuit, comprising:
a half-bridge switching circuit having a first switch and a second switch electrically connected in series;
a transformer having a primary winding and a secondary winding magnetically coupled to each other;
a resonant circuit electrically connected in series to the primary winding of the transformer;
a current sampling circuit configured to sample a primary current of the transformer and output a current sampling signal;
a rectifier circuit electrically connected to the secondary winding of the transformer; and
a control unit configured to control the first switch and the second switch of the half-bridge switching circuit, comprising:
an output voltage feedback unit configured to generate a first voltage feedback signal according to a reference voltage and an output voltage of the hybrid flyback circuit;
a peak current comparison unit configured to compare a sampling voltage corresponding to the current sampling signal with the first voltage feedback signal, wherein when the sampling voltage corresponding to the current sampling signal is equal to the first voltage feedback signal, the control unit turns off the first switch;
a first dead time delay unit configured to drive the control unit to turn on the second switch after a first dead time starting from the turn-off time of the first switch;
a negative peak current feedback unit configured to obtain a negative peak current value of the primary current according to the current sampling signal, and generate a second voltage feedback signal according to the negative peak current value and a reference current;
a conduction control unit configured to control a conduction duration of the second switch according to the second voltage feedback signal, wherein the control unit turns off the second switch according to the conduction duration; and
a second dead time delay unit configured to drive the control unit to turn on the first switch after a second dead time starting from the turn-off time of the second switch.

2. The hybrid flyback circuit according to claim 1, wherein the conduction control unit comprises:
a conduction timing unit, wherein the conduction timing unit is configured to detect the turn-on time of the second switch to generate a voltage signal reflecting the conduction duration of the second switch; and
a conduction comparison unit configured to compare the voltage signal reflecting the conduction duration of the second switch with the second voltage feedback signal, wherein when the voltage signal is equal to the second voltage feedback signal, the control unit turns off the second switch.

3. The hybrid flyback circuit according to claim 1, wherein the conduction control unit comprises:
a conduction timing unit configured to detect the turn-on time of the second switch, obtain the conduction duration of the second switch and output a timing result; and
a conduction comparison unit configured to set a first predetermined duration according to the second voltage feedback signal, wherein when the timing result is equal to the first predetermined duration, the control unit turns off the second switch.

4. The hybrid flyback circuit according to claim 1, wherein the control unit further comprises a current holding unit for detecting the turn-off time of the second switch, and obtaining the negative peak current value of the primary current according to the current sampling signal after a second predetermined duration starting from the turn-off time of the second switch.

5. The hybrid flyback circuit according to claim 4, wherein the second predetermined duration is less than or equal to 200 ns.

6. The hybrid flyback circuit according to claim 1, wherein the reference current satisfies with the following formula:

$$I_{neg\_ref} \geq \sqrt{\frac{(C_{oss1} + C_{oss2})V_{in}^2}{L_m}},$$

wherein Lm is an inductance value of a magnetizing inductor of the resonant circuit, $I_{neg\_ref}$ is the reference current, $C_{oss1}$ is a capacitance value of a first parasitic capacitor of the first switch, $C_{oss2}$ is a capacitance value of a second parasitic capacitor of the second switch, and $V_{in}$ is an input voltage of the hybrid flyback circuit.

7. The hybrid flyback circuit according to claim 1, wherein the negative peak current value is equal to the primary current being detected after the second predetermined duration starting from the turn-off time of the second switch in the previous switching cycle.

8. The hybrid flyback circuit according to claim 7, wherein the second predetermined duration is less than or equal to 200 ns.

9. The hybrid flyback circuit according to claim 1, wherein the first switch is the upper switch of the half-bridge switching circuit, and the second switch is the lower switch of the half-bridge switching circuit.

10. The hybrid flyback circuit according to claim 1, wherein the first switch is the lower switch of the half-bridge switching circuit, and the second switch is the upper switch of the half-bridge switching circuit.

11. A control method for a hybrid flyback circuit, wherein the hybrid flyback circuit comprises a half-bridge switching circuit, a transformer, a resonant circuit and a current sampling circuit, and the half-bridge switching circuit comprises a first switch and a second switch electrically connected in series, and the transformer comprises a primary winding and a secondary winding magnetically coupled to each other, and the resonant circuit is electrically connected in series to the primary winding, the control method comprising:
(S1) sampling an output voltage of the hybrid flyback circuit and generating a first voltage feedback signal according to a reference voltage and the output voltage;
(S2) sampling a primary current of the transformer and outputting a current sampling signal;
(S3) comparing a sampling voltage corresponding to the current sampling signal with the first voltage feedback signal, and turning off the first switch when the sampling voltage corresponding to the current sampling signal is equal to the first voltage feedback signal;
(S4) turning on the second switch after a first dead time starting from the turn-off time of the first switch;
(S5) obtaining a negative peak current value of the primary current according to the current sampling signal, and generating a second voltage feedback signal according to the negative peak current value and a reference current;
(S6) controlling the conduction duration of the second switch according to the second voltage feedback signal, and turning off the second switch; and
(S7) turning on the first switch after a second dead time starting from the turn-off time of the second switch.

12. The control method according to claim 11, wherein the step (S6) further comprises:
detecting the turn-on time of the second switch to generate a voltage signal reflecting the conduction duration of the second switch; and
comparing the voltage signal with the second voltage feedback signal and turning off the second switch when the voltage signal is equal to the second voltage feedback signal.

13. The control method according to claim 11, wherein the step (S6) further comprises:
detecting the turn-on time of the second switch, obtaining the conduction duration of the second switch, and outputting a timing result; and
setting a first predetermined duration according to the second voltage feedback signal, and turning off the second switch when the timing result is equal to the first predetermined duration.

14. The control method according to claim 11, wherein in the step (S5), the negative peak current value is equal to the primary current being detected after the second predetermined duration starting from the turn-off time of the second switch in the previous switching cycle.

15. The control method according to claim 14, wherein the second predetermined duration is less than or equal to 200 ns.

16. The control method according to claim 11, wherein the reference current satisfies with the following formula:

$$I_{neg\_ref} \geq \sqrt{\frac{(C_{oss1} + C_{oss2})V_{in}^2}{L_m}},$$

wherein Lm is an inductance value of a magnetizing inductor of the transformer, $I_{neg\_ref}$ is the reference current, $C_{oss1}$ is a capacitance value of a first parasitic capacitor of the first switch, $C_{oss2}$ is a capacitance value of a second parasitic capacitor of the second switch, and $V_{in}$ is an input voltage of the hybrid flyback circuit.

17. The control method according to claim 11, wherein the first switch is the upper switch of the half-bridge switching circuit, and the second switch is the lower switch of the half-bridge switching circuit.

18. The control method according to claim 11, wherein the first switch is the lower switch of the half-bridge switching circuit, and the second switch is the upper switch of the half-bridge switching circuit.

* * * * *